F. RAY.
RING GAGE.
APPLICATION FILED JUNE 12, 1916.

1,332,571.

Patented Mar. 2, 1920.

Inventor:
Frederick Ray
by Wm. J. Bissing
Attorney.

UNITED STATES PATENT OFFICE.

FREDERICK RAY, OF SHORT HILLS, NEW JERSEY.

RING-GAGE.

1,332,571. Specification of Letters Patent. Patented Mar. 2, 1920.

Application filed June 12, 1916. Serial No. 103,276.

*To all whom it may concern:*

Be it known that I, FREDERICK RAY, a citizen of the United States, residing at Short Hills, Essex county, State of New Jersey, have invented certain new and useful Improvements in Ring-Gages, of which the following is a specification.

My invention relates to ring gages for gaging divided rings and particularly for gaging the radial reaction of such rings and determining when the ring assumes a circular form.

One of the objects of my invention is to accurately determine whether or not a divided piston ring which has been hammered, treated, or suitably designed so as to exert a uniform, radial, outward pressure when circular, does in fact accomplish this result. Another object of my invention is to provide a gaging instrument in which uniform, radial pressure is simultaneously applied at a number of points uniformly distributed around the circumference of the ring, and to indicate by means of a reference ring or measuring device when the ring has assumed a circular shape. Under this condition it will exert a uniform, radial outward pressure.

With the above and other objects in view my invention consists in the parts, improvements and combinations more fully pointed out hereinafter.

Figure 1:
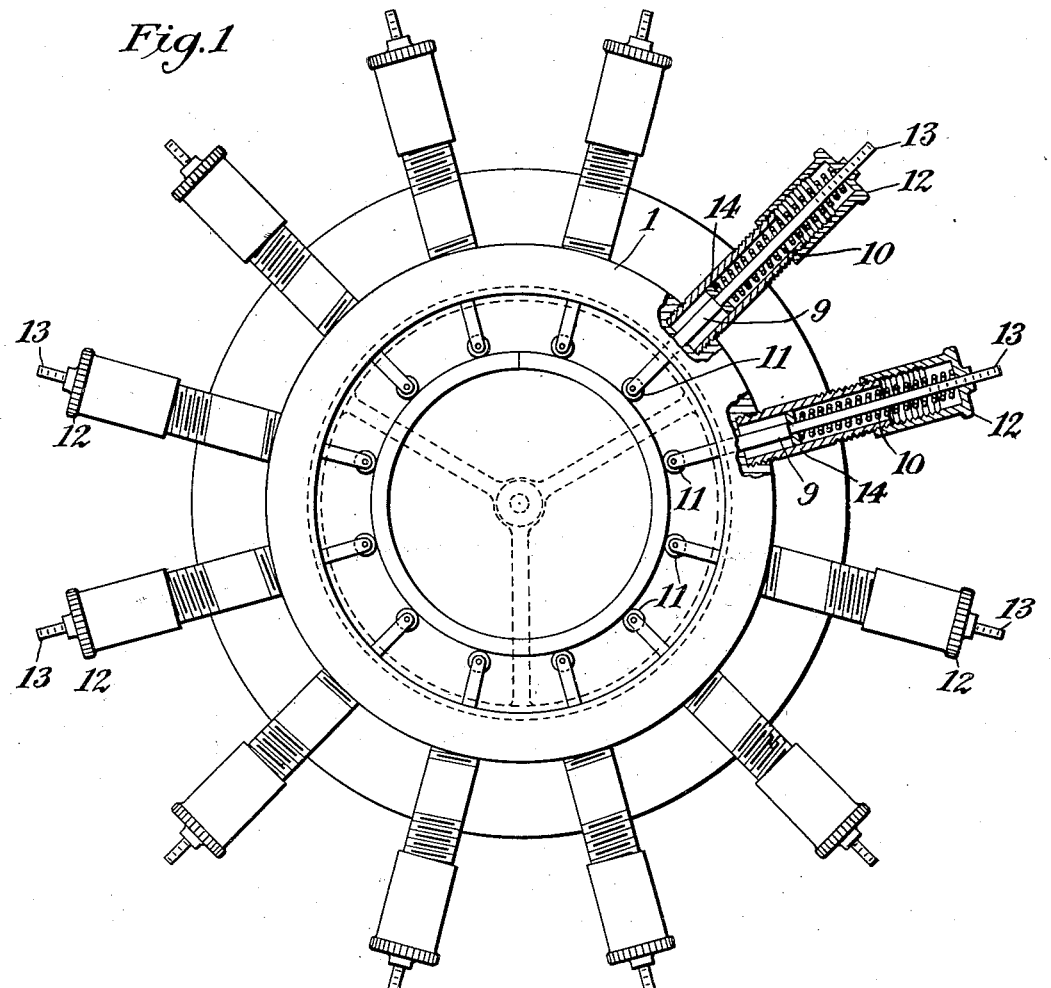
Figure 2:
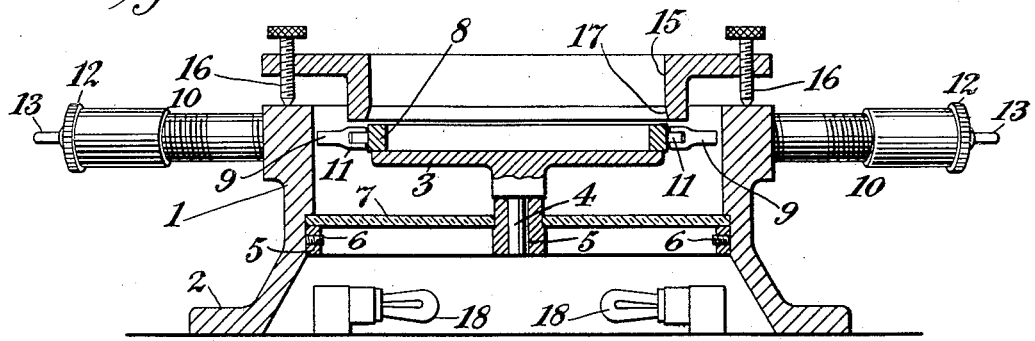

Referring now to the drawings which form part of the specification:

Figure 1 shows a plan view of the gaging instrument as well as a divided ring whose radial pressure is about to be measured; and Fig. 2 is a vertical cross-section of the machine shown in Fig. 1.

In the machine illustrated, the circular frame 1 is supported by legs 2 and supports in turn a platform 3. The platform is removably mounted upon the frame 1 by a pivot 4 passing through an opening 5 formed in a cross member of a removable frame 50. The frame is in turn removably secured in the main frame 2 by screws 6. The ground glass screen 7 is held in place between the frame 50 and the frame 1 as indicated. The platform 3 provides a support for the ring to be gaged.

Suitable means are provided for imparting a system of concentrated loads uniformly distributed about the ring. A plurality of spring loaded plungers uniformly distributed about the ring are utilized for this purpose. The number of plungers should be such that the local radial distortion of the ring due to the concentrated load is so slight compared to the radius of curvature of the ring, that it can be neglected. In the form illustrated, for a ring of about four inches in diameter twelve plungers will accomplish this result. The plungers 9 pressed upon by springs 10 have anti-friction rollers 11 at their ends which engage the ring. The load on the springs 10 may be varied or adjusted by means of the screw cap 12 forming part of the housing of the spring. The scale 13 on the plunger 9 indicates the resultant compression of the spring and the load applied by the plunger to the ring. As shown the base portions 14 of the housings of the spring pressed plungers are screwed into the circular frame 1.

Means are provided for indicating the resultant distortion of the ring. In the form of the invention illustrated these means comprise a circular die or circular gaging device 15 carried by leveling screws 16 so as to be centered and leveled about the ring 8. The die is preferably provided with a beveled portion 17 so as to take care of slight variations in the size of the ring and to more readily observe whether or not it has assumed a circular form. A source of illumination such as an electric lamp 18 sends its light through the space between the ring 8 and the beveled portion 17 to the eye of the observer looking down upon the instrument.

I have just described the construction. The operation of the device will readily appear. The springs are adjusted so that each will show an equal, uniform load about the ring. If the piston ring has been hammered in a hammering machine the ring will react against radial compression and will bend outwardly under the influence of the stresses imparted to it. If the outward pressure exerted by the ring is equal and uniform around its circumference, and the ring has been subjected to uniformly distributed, concentrated loads by the spring pressed plungers, the ring will assume a circular shape. Its circularity can be readily determined by inspection and comparison with the ring guide 15 or by means of calipers or other suitable instrumentalities, all of which I designate as a circular gaging device. If the ring under the action of these concentrated loads of uniform intensity does not assume a circular form, then the loads on the plungers may be varied until circularity of the ring is obtained. The distribution of the loads to give this circularity can then be read from the scales on the plungers.

Having described my invention what I claim is:

1. A ring gaging instrument for determining the departure from true circularity of an elastic divided piston ring which reacts against radial compression, comprising the combination of a system of uniformly spaced yielding means for applying concentrated loads, arranged around the ring, and a circle gaging device for gaging the circularity or non-circularity of the ring while under the application of said loads.

2. A ring gaging instrument for determining the departure from true circularity of an elastic divided piston ring which reacts against radial compression, comprising the combination of a plurality of spring loaded plungers for applying a system of concentrated loads about the ring and a circle gaging device for gaging the circularity or non-circularity of the ring while under the application of said load.

3. In an instrument for gaging the radial reaction of a resilient divided piston ring which reacts against radial compression, the combination of a plurality of spring loaded plungers uniformly distributed about the ring and means for indicating any departure from circular form of the ring.

4. In an instrument for gaging the radial reaction of a resilient divided piston ring which reacts against radial compression, the combination of a plurality of spring loaded plungers, means for varying the tension of said springs in such manner as to cause the ring to tend to assume a circular shape and means for gaging the circularity imparted to the said ring.

5. In an instrument for gaging the radial reaction of a resilient divided piston ring which reacts against radial compression, the combination of a plurality of spring loaded plungers, means for varying the tension of said springs in such manner as to cause the ring to tend to assume a circular shape, means for gaging the circularity imparted to the ring, and means for indicating the load on each spring.

6. In an instrument for gaging the radial reaction of a resilient divided piston ring which reacts against radial compression, the combination of a plurality of spring loaded plungers, each of said plungers being provided with an anti-friction roller contacting with said ring, means for varying the tension of said springs in such manner as to cause the ring to tend to assume a circular shape and means for gaging the circularity imparted to the said ring.

7. In an instrument for gaging the radial reaction of a resilient divided piston ring which reacts against radial compression, the combination of a frame, a plurality of spring loaded plungers carried by the frame and distributed uniformly about the frame, means for adjusting the compression of each spring, a platform for supporting the ring and a circular die for gaging the circularity imparted to the ring by the plungers.

8. In an instrument for gaging the radial reaction of a resilient divided piston ring which reacts against radial compression, the combination of a frame, a plurality of spring loaded plungers carried by the frame and distributed uniformly about the frame, means for adjusting the compression of each spring, a platform for supporting the ring, a circular die for gaging the circularity imparted to the ring by the plungers, a ground glass screen mounted beneath said table and a source of illumination below the same.

9. In an instrument for gaging the radial reaction of a resilient divided piston ring which reacts against radial compression, the combination of a frame, a plurality of spring loaded plungers carried by the frame, and distributed uniformly about the frame, means for adjusting the compression of each spring, a platform for supporting the ring, a circular die for gaging the circularity imparted to the ring by the plungers and set screws for leveling said circular die.

10. A ring gaging instrument for gaging the radial reaction of a resilient divided piston ring which reacts against radial compression, comprising a support for such ring, and a plurality of adjustably spring-loaded plungers adjacent the ring support for imparting a system of equal concentrated loads about the ring tending to compress the same to a circular form, whereby any departure from circularity in the compressed ring may be determined and a circle gaging device for determining the circularity of the ring while the ring is subjected to said loads.

11. The method of gaging the radial reaction of a resilient divided piston ring, which reacts against radial compression, which comprises compressing the ring by applying thereto at equally spaced points a series of inward-directed equal yielding concentrated loads and determining the resultant shape of the ring.

12. That step in the method of gaging the radial reaction of a resilient divided piston ring which reacts against radial compression, which consists in compressing the ring by applying thereto at equally spaced points a series of inward-directed equal yielding concentrated loads.

In testimony whereof, I have signed my name to this specification, in the presence of two subscribing witnesses.

FREDERICK RAY.

Witnesses:
 ELSIE GREENBERGER,
 J. HOWARD BREESE.